Figure 2:
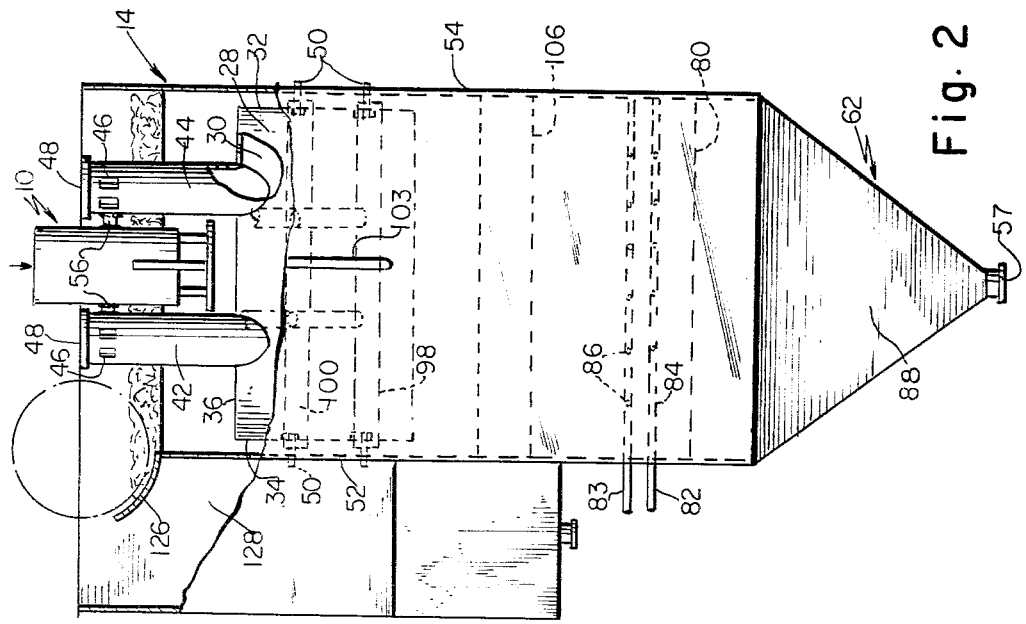

May 10, 1966  L. CLARK  3,250,394
FLOTATION APPARATUS

Filed May 3, 1963  2 Sheets-Sheet 1

INVENTOR.
LINCOLN CLARK
BY Joshua J Ward
ATTORNEY

May 10, 1966   L. CLARK   3,250,394
FLOTATION APPARATUS
Filed May 3, 1963   2 Sheets-Sheet 2

INVENTOR.
LINCOLN CLARK
BY Joshua J. Ward
ATTORNEY

United States Patent Office 3,250,394
Patented May 10, 1966

3,250,394
FLOTATION APPARATUS
Lincoln Clark, Newport Beach, Calif., assignor, by direct and mesne assignments, of thirty percent each to Cities Service Athabasca, Inc., a corporation of Delaware, Imperial Oil Limited, a corporation of Canada, and Richfield Oil Corporation, a corporation of Delaware, and ten percent to Royalite Oil Company, Limited, a corporation of Canada
Filed May 3, 1963, Ser. No. 277,928
3 Claims. (Cl. 210—221)

This invention relates to flotation apparatus for recovering hydrocarbons from petroliferous solids. More particularly this invention relates to flotation apparatus which is especially suitable for recovering bitumen from bituminous sand.

Large deposits of bituminous sand are found in various localities throughout the world. One of the most extensive deposits of bituminous sand occurs, for instance, in the Athabasca district of the Province of Alberta, Canada. The term "bituminous sand" is used herein to include those materials commonly referred to as oil sand, tar sand and the like.

Many of the prior art techniques for recovering bitumen from an aqueous slurry of bituminous sand use air in order to float bitumen as a froth. The air is introduced, by means such as spargers or jets, into the lower portions of a settling or stripping tank containing a column of water and a bituminous sand slurry.

Typically the composition of these sands contain, by weight: from about 6% to about 20% of oil; from about 1% to about 10% of water; and from about 70% to about 90% of inorganic solids. The specific gravity of the bitumen varies from about 1.0 to about 1.05. (The specific gravity of the bitumen as well as all other values of specific gravity given herein are taken at 60° F.) The major portion, by weight of the inorganic solids is fine grain quartz sand having a particle size greater than about 45 microns and less than 2000 microns. The remaining inorganic solid matter has a particle size of less than 45 microns and is referred to as fines. The fines contain clay and silt including some very small particles of sand. The fines content typically vary from about 10% to about 30% by weight of the solid inorganic content of bituminous sand. The true specific gravity of the sand is about 2.65 whereas that of the fines is about 2.7. However, the composition of bituminous sand can vary from the above mentioned ranges and this is not too uncommon. Also, in mining the bituminous sand, clay which is found in layers of varying thickness in such sand areas, may be admixed with the bitumen thus increasing the inorganic solids content and particularly the fines content of the material to be processed.

The apparatus employed by the prior art for flotation of bitumen does not effectively strip the bitumen from sand and fines or requires a multiplicity of procedures and apparatus. Furthermore, many of the strippers, also referred to herein as flotation tanks, shown by the prior art are poorly suited for a continuous process. Commercial sizes of such prior art equipment also frequently require mechanical agitation as well as means such as rakes for moving sand horizontally within the tank.

It is a primary object of this invention to provide apparatus for the separation and recovery of bitumen from bituminous sand by flotation of the bitumen with air.

It is another object of this invention to provide apparatus for processing bituminous sand in a continuous process for the separation and recovery of bituminous froth and water separately, both being substantially free from sand.

Figure 1:
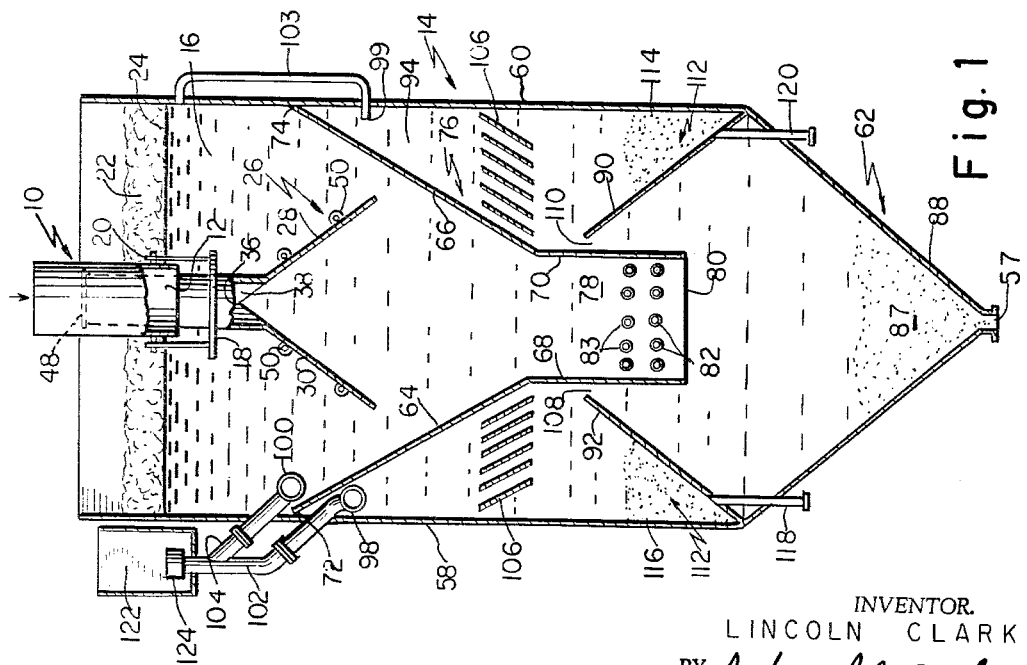
Figure 3:
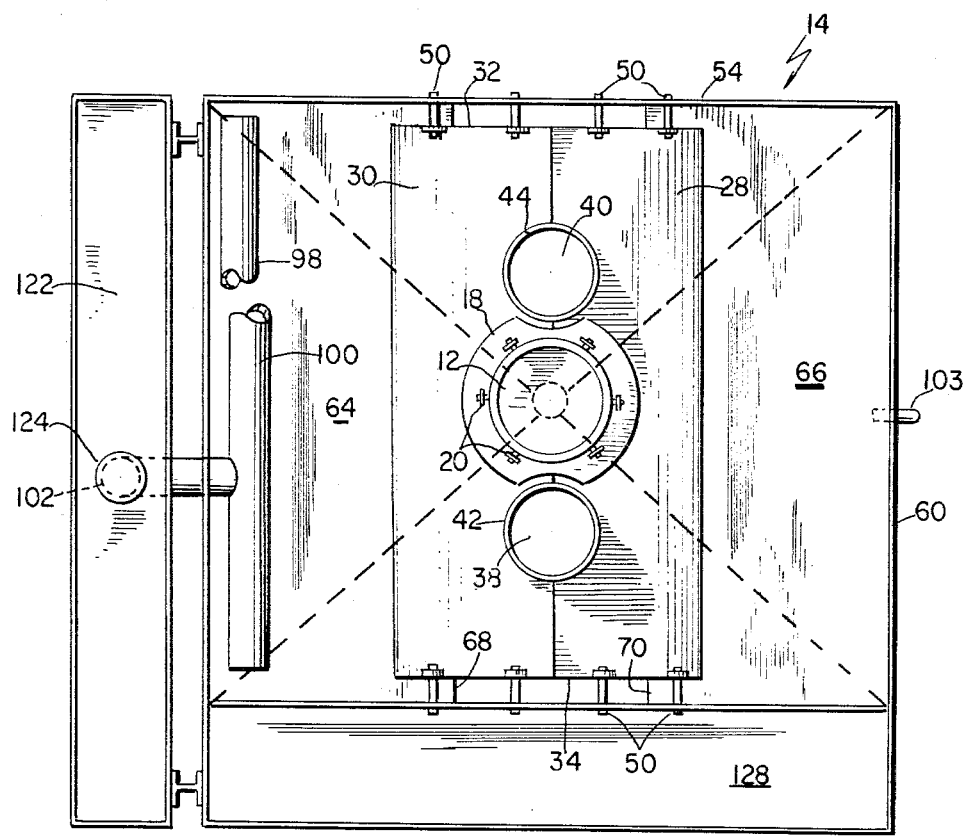

These and other aspects of the invention will be more fully understood from the following detailed description taken in conjunction with the accompanying drawings in which:

FIG. 1 is a side elevation of the novel stripping tank of this invention;
FIG. 2 is a partially cut away front view of the stripping tank of FIG. 1; and
FIG. 3 is a plan view of the stripper of FIGS. 1 and 2.

Briefly, the apparatus of this invention comprises a vertical tank having an opening at its bottom for the discharge of sand and means at its top for receiving a bituminous sand slurry and for recovering bituminous froth. Partitions attached to the shell of the tank slope downwardly within the tank forming a funnel which may be of conventional circular cross section or preferably is longitudinally extended in the form of an inclined trough and which has a bottom opening above the tank bottom. Means are provided such as spargers, jets, diffusers, or a combination of these for admitting air within the throat of the funnel. Partitions attached to the tank shell below the top of the funnel slope upwardly and extend to points adjacent the sloping funnel partition above the funnel opening. This upwardly sloping partition sub-divides the area within the tank outwardly of the funnel to provide for a compartment laterally of the funnel. Openings are provided at lower portions of the lateral compartment for removal of sand and an opening is provided above the lateral compartment sand removal opening for discharging water from the tank. The space between the end of the upwardly slanting partition and the funnel provides communication between the bottom of the tank and the lateral compartment. The use of this apparatus allows a combination of air flotation and non-mechanical agitation. In addition, the flow of sand through the apparatus may be entirely in a downward direction, thus making unnecessary the equipment usually needed in large scale equipment for moving sand in a horizontal direction.

Referring to the drawings wherein identical numerals refer to identical parts, 10 is a bituminous slurry intake pipe having an opening 12 for admitting the slurry into stripper 14 below the surface of a column of water 16. Below and in axial alignment with opening 12 is a horizontal baffle 18 on which the slurry impinges. Horizontal baffle 18 can be attached to intake pipe 10 by means of bracket assembly 20. A layer of bituminous froth 22 floats up above the surface 24 of the water. Below horizontal baffle 18 is a gas trap 26. The gas trap has downwardly slanted side panels 28 and 30 and vertical end panels 32 and 34. Thus the trap is in the form of a longitudinally extended triangular funnel having its apex 36 at the top. The trap 26 has two openings 38 and 40 through its apex communicating with vertical gas risers 42 and 44, which extend above the layer of foam 22. Above froth layer 22 are openings 46 venting the risers to the atmosphere and providing means for froth formed or collected within the trap to join the froth layer 22 in the stripper. The air trap can be attached to the ends 52 and 54 of the stripper by means of bolts or braces 50. The incoming slurry pipe 10 can be held in place and attached to the risers 42 and 44 by means of brackets 56.

The sides 58 and 60 and ends 52 and 54 of the stripper are substantially vertical except at lower side portions 62 of the stripper where the sides converge inwardly forming an inverted conical bottom. Downwardly inclined plates 64 and 66 which have substantially vertical lower portions 68 and 70 are attached adjacent their top edges 72 and 74 to the sides of the stripper 58 and 60 respectively. The sides of the downwardly inclined plates, 64 and 66 throughout their entire length including lower portions 68 and 70 are attached to ends 52 and 54 of the stripper. These plates in cooperation with ends 52 and 54 of the stripper form a longitudinally extended funnel or inclined trough 76 in the stripper. Except for top edges 72 and 74 the downwardly inclined plates are spaced from sides 58 and 60 of the stripper.

The slurry entering the stripper is mixed with the column of water in the stripper and the heavy particles in the slurry such as sand, particles of bitumen and fines move downwardly in trough 76 toward trough throat 78 and throat opening 80. Horizontal pipes such as 82 and 83 run transversely through the throat 78.

Pipes 82 have openings 84 for admitting air or any other appropriate flotation gas into the throat 78 of the trough 76; whereas pipes 83 have openings 86 for admitting water in the throat 78.

The sand passes downwardly through the trough throat and the sand 87 settles in the bottom 88 of the stripper. An opening 57 is provided in the bottom of the stripper for the discharge of sand. The discharge of sand 87 through opening 57 can be controlled by various conventional means such as a valve (not shown). Air or a combination of air and hot water is released through pipe openings 84 and 86 and travel upwardly to the trap. It should be noted that the release of hot water through pipe openings 84 and 86 is optional and all the fluids released through the pipes can be air. The air in its upward movement, which can be aided by hot water, floats the bitumen upwardly. In addition to bitumen some fines are also propelled upwardly. The rising air including bitumen (which may now be in the form of a froth) and fines rises to the top of the column of water 16 or when the gas trap 26 is employed is collected within the gas trap. The air, including bituminous froth and fines in the trap propelled upwardly into the risers where, it is discharged through openings 46. The froth and fines fall downwardly from openings 46 onto the layer of froth in the stripper while excess air moves upwardly into the atmosphere. The lower portion of the stripper 14 has upwardly sloping baffles 90 and 92. These baffles are attached to the sides 58 and 60 of the stripper and extend to a point above the sides of the opening 80 in the throat 78 in spaced relation to the funnel, thus leaving an opening to lateral compartments 94 and 96 formed above baffles 90 and 92. Excess water flows out of the stripper through openings 98 and 99 and egress pipes 102 and 103. Optionally, pipe 104 with opening 100 can be provided for removing a portion of the water from funnel 76. The lateral compartment 94 and 96 have secondary impingement baffles 106. Baffles 90, 92 and 106 extend across the stripper and are attached to ends 52 and 54. Water from opening 80 in throat 78 flows toward discharge openings 98 and 99 between the openings 108 and 110 defined by baffles 90 and 92 with the sides of throat 78. Sand carried in the water impinges on baffles 90 and 92 and falls toward bottom 88 where the major portion of sand is collected. Water flowing past openings 108 and 110 impinges against baffles 106 where additional sand 112 is separated and falls in troughs 114 and 116. Conduit means 118 and 120 remove sand from the troughs 114 and 116. The water then flows out of pipes 102 and 103 into conduit 122 which has means, not shown in the drawings, for disposing of the egress water, or alternately for recirculation or further processing to remove fines. Vertically adjustable cylinder 124 is provided at the top of pipe 102 for adjusting the level of the water in stripper 14. Cylinder 124 can be raised or lowered by various means such as the use of screw threads or frictional surfaces in cooperation with pipe 102.

While the stripper has been described above as having only one slurry intake pipe 10 flanked by two gas risers 42 and 44, additional intake pipes and risers may be provided as desired, depending upon the size of the stripper. It will usually be found desirable to have the stripper relatively long and narrow. In this case additional risers and intake pipes will preferably be spaced along the length of the gas trap 26. Similarly, additional sets of lower side portions 62 and openings 57 may be provided along the length of the stripper.

The top of the stripper has arcuate plate 126 leading into a trough 128 having a narrowed section 127 at its bottom for recovery of froth. Above arcuate plate 126 are means such as a paddle wheel, shown in dotted lines at 129, for skimming the layer of froth 22 off the top of the tank. This can best be seen in FIGURE 2. Arcuate plate 126 acts as a weir over which the foam flows either with or without assistance from paddle wheels 129.

The gas trap 26 is not necessary in the apparatus of this invention since the flotation tank is operable without the gas trap, although the solids content of the froth will be higher in the absence of the gas trap.

The invention will be more readily understood from the following detailed description of a continuous process where quantities are given on a per hour basis, unless otherwise indicated, in conjunction with the drawings.

An aqueous slurry of Alberta bituminous sand is passed into the top of stripper 14 by means of inlet pipe 10 below the surface 24 of the column of water 16. The bituminous sand prior to slurrying contains 2,326 pounds of bitumen, 1,557 pounds of water and 16,000 pounds of solids, which on a weight basis is 11.7% bitumen, 5.3% water and 83.0% solids. A small part of the bitumen is lost by mixing in a tumbler having an end opening for discharging stone which is mined with the bituminous sand. Sufficient water is added to the bituminous sand in the tumbler and prior to the slurry's entrance in the stripper so that the bituminous sand slurry contains 2,316 pounds of bitumen, 13,792 pounds of water and 15,815 pounds of solids. There is also fed 300 standard cubic feet per minute per square foot of air within throat 78 of the stripper through pipe 82 and openings 84. The air is fed in at 20 p.s.i.g. and 60° F. The temperature at which the slurry enters the stripping tank is about 180° F. and the water in the stripping tank is maintained at this temperature. In addition to the air there is separately introduced 7,900 pounds of water through the pipe 83 having openings 86 at a temperature of about 180° F. Froth at about 170° F. is recovered from the top of the stripper by overflow from plate 126 or skimming with the paddle 129 over the plate 126 and is passed to trough 128. 15,772 pounds of effluent water, is recovered from the stripper through trough 122. The effluent water also contains 446 pounds of bitumen and 2,080 pounds of solids which are composed almost entirely of fines. Solids are recovered from the bottom opening 57 of the stripper and from lateral compartments 94 and 96 through pipes 118 and 120. The total amount of solids, which are composed of sand and fines, recovered from the stripper is 13,275 pounds. Additionally 4,500 pounds of water and 100 pounds of bitumen are mixed in with the solids. The froth from the stripper contains 1,780 pounds of bitumen, 1,420 pounds of water and 460 pounds of solids which are composed almost entirely of fines. Thus the froth is composed of 48.7% bitumen, 38.8% water and 12.5% solids.

The hereinabove description is directed to illustrate a preferred embodiment of apparatus and process for practicing the invention, and it will be understood that various modifications may be made without departing from the scope of the invention.

The flotation gas is preferably air but other flotation gases such as methane, or nitrogen can also be employed.

It should be pointed out that the flotation apparatus and process described above may also be employed to carry out other separations involving flotation. Illustratively, where iron sulfide is to be converted to iron oxide, and the iron sulfide is in the form of a fine suspension of solid material and water, such a suspension may be employed as a feed liquid and air may be employed as a flotation agent in the apparatus of this invention. The iron sulfide is then converted to iron oxide and free sulfur in the flotation operation, and the sulfur is floated to the top of the tank and skimmed off in much the same manner as described for the bitumen.

I claim:

1. A flotation apparatus comprising an upstanding tank, a funnel including downwardly sloping sides and a throat having an opening at its bottom within said tank, upwardly slanted baffle means in said tank, said baffle means forming a lateral compartment between said downwardly sloping sides of the funnel and the tank, said baffle means at its lower end being affixed to the inner wall of the tank and at its upper end extending above the throat opening of said funnel, said upper end of the baffle means being spaced apart from the sides of said funnel thereby providing a communicating opening between the bottom of said tank and said lateral compartment, means for admitting liquid into the funnel above the throat, means for admitting air in said throat, means for removing solids from the bottom of the tank, means in said lateral compartment below said communicating opening for removing solids, means in said lateral compartment for removing water therefrom, said water removing means being located above said means for removing solids from the lateral compartment, impingement baffles within said lateral compartment spaced between said communicating opening and said water removing means.

2. The apparatus of claim 1 in which said liquid admitting means comprises a liquid intake conduit extending downwardly into said tank and terminating above said throat of the funnel.

3. The apparatus of claim 1 and including means for removing froth from the uppermost portion of the tank above the funnel.

References Cited by the Examiner

UNITED STATES PATENTS

| 1,639,373 | 8/1927 | Glover | 210—519 |
| 1,869,241 | 7/1932 | Elie | 209—170 X |
| 2,983,677 | 5/1961 | Boyd et al. | 209—170 X |
| 3,187,897 | 6/1965 | Walker | 210—221 X |

FOREIGN PATENTS

| 904,472 | 8/1962 | Great Britain. |

REUBEN FRIEDMAN, *Primary Examiner.*

J. DECESARE, *Assistant Examiner.*